United States Patent
Koshida

(10) Patent No.: US 8,086,164 B2
(45) Date of Patent: Dec. 27, 2011

(54) IMAGE FORMING SYSTEM

(75) Inventor: Kohei Koshida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 12/477,481

(22) Filed: Jun. 3, 2009

(65) Prior Publication Data

US 2009/0304428 A1    Dec. 10, 2009

(30) Foreign Application Priority Data

Jun. 6, 2008  (JP) .................................. 2008-149538

(51) Int. Cl.
   *G03G 15/00*    (2006.01)
(52) U.S. Cl. ........................ 399/377; 399/366; 399/405
(58) Field of Classification Search .................. 399/377, 399/369, 405, 366, 361, 363, 365; 271/9.01, 271/279

See application file for complete search history.

(56) References Cited

U.S. PATENT DOCUMENTS

| | | | | |
|---|---|---|---|---|
| 5,163,670 A | * | 11/1992 | Sellers et al. | 271/157 |
| 5,357,329 A | * | 10/1994 | Ariyama et al. | 399/16 |
| 2005/0271400 A1 | * | 12/2005 | Okamoto et al. | 399/21 |

FOREIGN PATENT DOCUMENTS

| JP | 61-140435 | 6/1986 |
|---|---|---|
| JP | 2001-132296 | 5/2001 |

* cited by examiner

*Primary Examiner* — Ren Yan
*Assistant Examiner* — Ruben Parco, Jr.
(74) *Attorney, Agent, or Firm* — Fitzpatrick, Cella, Harper & Scinto

(57) ABSTRACT

An image forming system including: an image reading portion, which reads an image on an original; an image forming portion, which forms an image on a sheet; and a storage device, which stores an original before the image reading portion reads an image thereon and a sheet before the image forming portion forms an image thereon, the storage device being detachably mounted to the image forming system.

4 Claims, 11 Drawing Sheets

IMAGE FORMING SYSTEM

BACKGROUND OF THE INVENTION

1. Field of the Invention

The present invention relates to an image forming system.

2. Description of the Related Art

Conventionally, an image forming system such as a digital copying machine, a printer, and a facsimile is provided with an image reading portion for reading an image on an original and an image forming portion for forming an image based on image information read by the image reading portion or transmitted from an outside source.

Incidentally, in some cases, in a copying machine as an example of the above-mentioned conventional image forming system, the original such as a confidential document, which is preferably protected from being looked at by others, is read by the image reading portion, and then the image is copied (formed) on a sheet by the image forming portion according to the read image information (confidential information). Further, there is a case in which image information input from an outside personal computer or the like is formed on the sheets by the image forming portion.

In this regard, for example, when copying the confidential document, there is employed a copying machine in which the confidential document is set into a confidential original receiving box having a lid with a lock, and an inside thereof is sealed so as to prevent the confidential document from being subjected to others' eyes (refer to Japanese Patent Application Laid-Open No. S61-140435).

On the other hand, among sheets on which confidential information is copied, there are sheets, such as a financial certificate, whose security needs to be ensured even before copying. Further, there is known a copying machine in which, in the case of copying the above-mentioned sheets, a feed cassette containing the sheets is mounted and locked to an image forming apparatus main body so as to prevent the feed cassette from being detached from the image forming apparatus main body (refer to Japanese Patent Application Laid-Open No. 2001-132296).

However, the above-mentioned conventional copying machine is provided with the confidential original receiving box for containing the confidential original and the cassette for performing locking, which are mounted thereto for copying the confidential document on the sheet, whose security needs to be ensured. Therefore, the copying machine occupies space which is unnecessary for an ordinary copy. In addition, in this case, the confidential original receiving box and the cassette for performing locking are provided separately, thereby making a user's copying operation complicated.

Further, while the security is ensured during the copying operation, it is impossible to ensure the confidentiality when the user carries the confidential document or the confidential recording to the copying machine sheet before a copying operation.

SUMMARY OF THE INVENTION

The present invention has been made in view of the above-mentioned circumstances, and an object of the present invention is therefore to provide an image forming system capable of ensuring security of information and improving usability.

The present invention provides an image forming system including: an image reading portion, which reads an image on an original, an image forming portion, which forms an image on a sheet, and a storage device, which stores an original before the image reading portion reads an image thereon and a sheet before the image forming portion forms an image thereon, the storage device being detachably mounted to the image forming system.

According to the present invention, by storing a before-image-read original and a before-image-formation sheet in the detachable storage device, it is possible to simultaneously ensure the security of the information and improve usability.

Further features of the present invention will become apparent from the following description of exemplary embodiments with reference to the attached drawings.

DESCRIPTION OF THE EMBODIMENT

Hereinafter, an exemplary embodiment of the present invention is described in detail with reference to the drawings.

Figure 1:
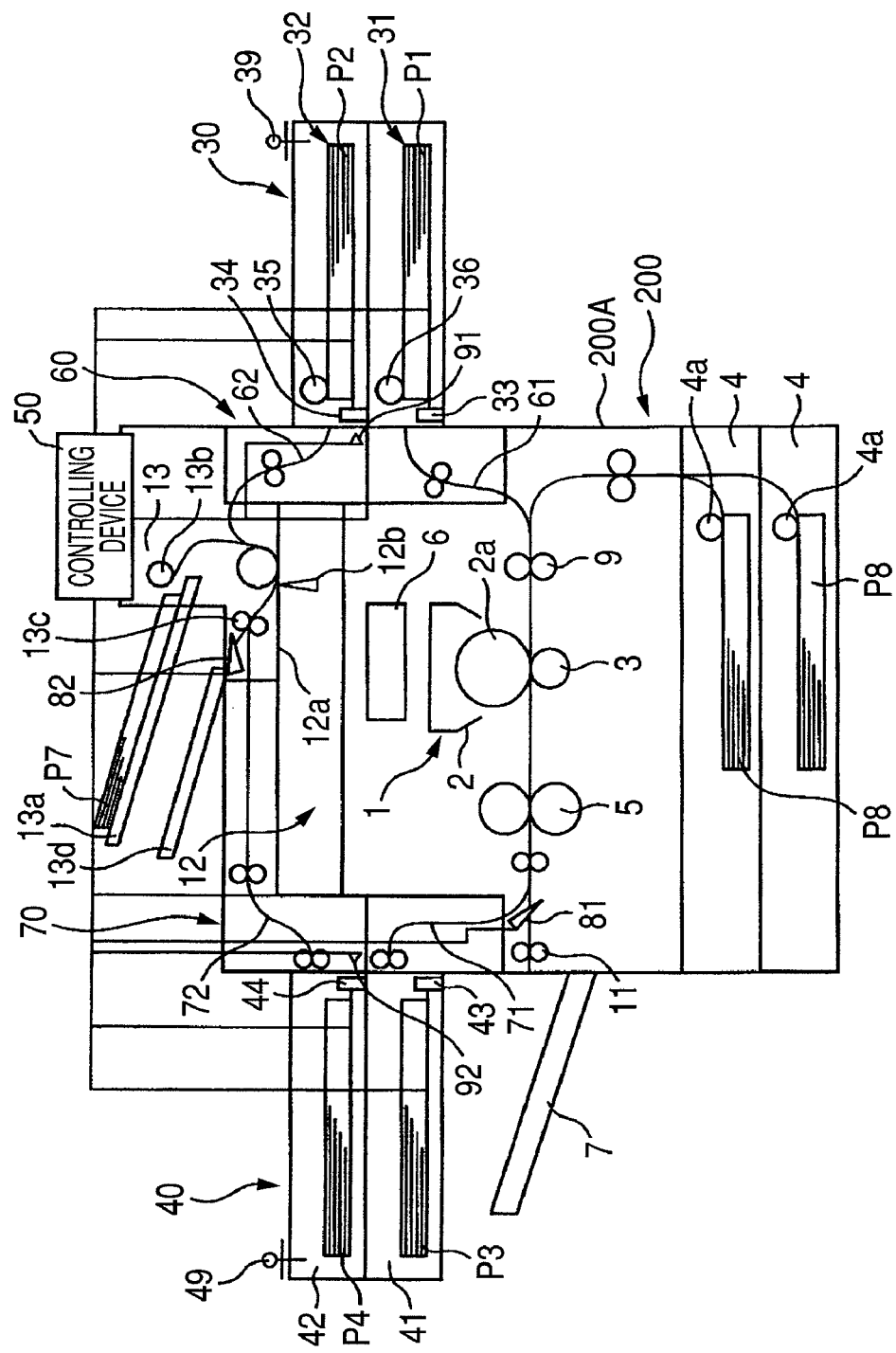
FIG. 1 is a view illustrating a structure of a copying machine as an example of an image forming apparatus according to an embodiment of the present invention.

FIG. 1 is a view illustrating a structure of a copying machine as an example of an image forming system according to the embodiment of the present invention.

FIG. 1 illustrates a copying machine 200 as an image forming system and a copying machine main body 200A. An image reading device 12 constituting an image reading portion is provided in an upper portion of the copying machine main body 200A, and an image forming portion 1 is provided in an inside of the copying machine main body 200A. Further, on an upper surface of the copying machine main body 200A, there is provided an auto document feeder (ADF) 13 for feeding originals to a platen glass 12a.

In this case, the auto document feeder 13 is formed so as to be openable and closable with respect to the image reading device 12, and presses an original placed on the platen glass. The auto document feeder 13 is provided with an original stacking table 13a on which plural originals P7 can be stacked. Further, the image reading device 12 is provided with a contact image sensor 12b for reading the original placed on the platen glass, or flow-reading the original P7 conveyed by the auto document feeder 13 and passing on the platen glass.

Further, when an operator instructs to start reading by an operating portion 51 illustrated in FIG. 5 described later, a pickup roller 13b of the auto document feeder 13 is rotated. In association with the rotation, the originals P7 set on the original stacking table 13a are separated one by one, thereby being conveyed to an image reading position, and the images thereon are read by the contact image sensor 12b. After that, the originals, images on which have been read, are delivered on a delivering tray 13d provided on the upper surface of the auto document feeder 13 by a sheet delivering roller pair 13c.

On the other hand, in the image forming portion 1, there are provided a process cartridge 2 including a cylindrical photosensitive drum 2a, a charger, a developing device, and a cleaning device (the latter three are not shown), and an exposing device 6. Further, on a downstream side of the image forming portion 1, there are provided a fixing device 5 and a delivery roller pair 11.

Then, as described above, the images on the originals are read by the image reading device 12, and the read image information is input to the exposing device 6, and the exposing device 6 irradiates light according to the image information onto the photosensitive drum 2a through an intermediation of a polygon mirror (not shown).

In this case, the surface of the photosensitive drum 2a is uniformly charged by the charger (not shown). When light is irradiated in this manner, an electrostatic latent image is formed on the surface of the photosensitive drum, and a toner image is formed on the surface of the photosensitive drum by developing the electrostatic latent image using the developing device (not shown).

On the other hand, along with the above-mentioned toner image forming operation, a sheet P8 set in a cassette 4 is conveyed to a registration roller 9 by a sheet feed roller 4a. Subsequently, the sheet P8 is conveyed by the registration roller 9 to a transferring portion formed by the photosensitive drum 2a and a transferring roller 3 at a timing so as to provide registry between a leading end of the sheet and a leading end of the toner image of the photosensitive drum 2a. Then, in this case, by application of transferring bias on the transferring roller 3, the toner image on the photosensitive drum is transferred on the sheet.

Next, the sheet P8 on which the toner image is transferred is conveyed to the fixing device 5, and the toner image is heat-fixed thereon when the sheet P8 passes through the fixing device 5. Then, the sheet P8 on which the toner image is fixed is delivered by the sheet delivering roller pair 11 on a delivering tray 7.

Note that, in this embodiment, to the copying machine main body 200A, there is selectively mounted a before-copy storage container 30 constituting a first storage container as a sealed storage device, which contains highly confidential before-copy (before image-read) originals and highly confidential before-copy (before-image-formation) sheets.

The sealed before-copy storage container 30 has in an inside thereof a before-copy original cassette 32 as a before-read original containing portion for storing highly confidential before-copy originals P2, and a before-copy sheet cassette 31 as a before-image-formation sheet containing portion for storing highly confidential before-copy sheets P1.

Further, the before-copy storage container 30 is provided with a pickup roller 35 for separating one by one the before-copy originals P2 stacked on the before-copy original cassette 32, and a pickup roller 36 for separating one by one the before-copy sheets P1 stacked on the before-copy sheet cassette 31, the pickup rollers 35 and 36 conveying the originals and the sheets, respectively. In addition, the before-copy storage container 30 is provided with a before-copy storage container lock 39 for restricting drawing-out of the before-copy original cassette 32 and the before-copy sheet cassette 31.

Note that, a before-copy original shutter 34 serving as a before-read original shutter is provided to the before-copy storage container 30. The before-copy original shutter 34 allows the before-copy originals P2 to be conveyed from the before-copy storage container 30 to the image forming portion 1 only in the case of a copy operation of confidential information, and prevents the before-copy originals P2 from being taken out in the case other than the above. Further, a before-copy sheet shutter 33 serving as a before-image-formation sheet shutter allows the before-copy sheets P1 to be conveyed from the before-copy storage container 30 to the image forming portion 1 only in the case of the copy operation of confidential information, and prevents the before-copy sheets P1 from being taken out in the case other than the above.

Further, with the structure of the before-copy storage container 30 detachably mountable to the copying machine main body 200A, the before-copy originals P2 and the before-copy sheets P1 can be carried by a single container, and the before-copy originals P2 and the before-copy sheets P1 can be processed together on a user's desk. As a result, security and operability for the user are improved.

Further, to the copying machine main body 200A, there is selectively mounted an after-copy storage container 40 as a sealed second storage device for storing after-copy (after-image-read) originals and after-copy (after-image-formation) sheets.

Further, the sealed after-copy storage container 40 has in an inside thereof an after-copy original cassette 42 as an after-read original containing portion for storing highly confidential after-copy originals P4, and an after-copy sheet cassette 41 as an after-image-formation sheet containing portion for storing after-copy sheets P3, the after-copy original cassette 42 and the after-copy sheet cassette 41 being detachably mounted in the sealed after-copy storage container 40. Further, the after-copy storage container 40 is provided with an after-copy storage container lock 49 for restricting drawing-out of the after-copy original cassette 42 and the after-copy sheet cassette 41.

Note that, an after-copy original shutter 44 serving as an after-read original shutter allows the confidential originals to be conveyed from the image forming portion 1 to the after-copy storage container 40 only in the case of the copy operation of confidential information, and prevents the after-copy originals P4 from being taken out from the after-copy storage container 40. An after-copy sheet shutter 43 serving as an after-image-formation sheet shutter allows the confidential sheets P3 to be conveyed from the image forming apparatus 200 to the after-copy storage container 40 only in the case of the copy operation of confidential information, and prevents the after-copy sheets P3 from being taken out from the after-copy storage container 40.

Further, with the structure of the after-copy storage container 40 detachably mountable to the copying machine main body 200A, the after-copy originals P4 and the after-copy sheets P3 can be carried by a single container, and the after-copy originals P4 and the after-copy sheets P3 can be processed together on a user's desk. As a result, security and operability for the user are improved.

Note that, FIG. 1 illustrates a before-copy path portion 60 as a first path portion provided in the copying machine main body 200A. The before-copy path portion 60 includes a before-copy original conveying path 62 serving as a before-read original conveying path for conveying the before-copy originals P2 contained in the before-copy storage container 30 to the image reading position of the image reading device 12. The before-copy path portion 60 further includes a before-copy sheet conveying path 61 as a before-image-formation sheet conveying path for conveying the before-copy sheets P1 to the image forming portion 1.

An after-copy path portion 70 serves as a second path portion provided in the copying machine main body 200A. The after-copy path portion 70 includes an after-copy original conveying path 72 serving as an after-read original conveying path for conveying the before-copy originals P2 whose information has been read by the image reading device 12 to the after-copy original cassette 42 of the after-copy storage container 40. The after-copy path portion 70 further includes an after-copy sheet conveying path 71 as an after-image-formation sheet conveying path for conveying to the after-copy sheet cassette 41 the after-copy sheets P3 on which the confidential images are formed by the image forming portion 1.

Further, provision of the before-copy path portion 60 and the after-copy path portion 70 in the copying machine main body 200A enables the confidential originals and the confidential sheets to be compactly stored together in the before-copy storage container 30 and the after-copy storage container 40. Further, the confidential originals can be copied without meeting others' eyes, whereby security is ensured and operatively for the user is improved.

Note that FIG. 1 illustrates a confidential original conveyance switching member 82 and a confidential sheet conveyance switching member 81. The confidential original conveyance switching member 82 performs switching between a conveying path for the confidential originals at the time of copy operation of confidential information and a conveying path for ordinary originals at the time of ordinary copy operation. The confidential sheet conveyance switching member 81 performs switching between a conveying path for the confidential sheets at the time of copy operation of confidential information and a conveying path for ordinary sheets at the time of ordinary copy operation.

A before-copy storage container detecting device 91 is provided to the copying machine main body 200A, and serves as a first mount detecting device for determining whether or not the before-copy storage container 30 is set. An after-copy storage container detecting device 92 is a second mount detecting device for determining whether or not the after-copy storage container 40 is set.

A controlling device 50 controls the copy operation (image-forming operation) of the copying machine 200. Detection signals from the before-copy storage container detecting device 91 and the after-copy storage container detecting device 92 are input to the controlling device 50.

Figure 2:
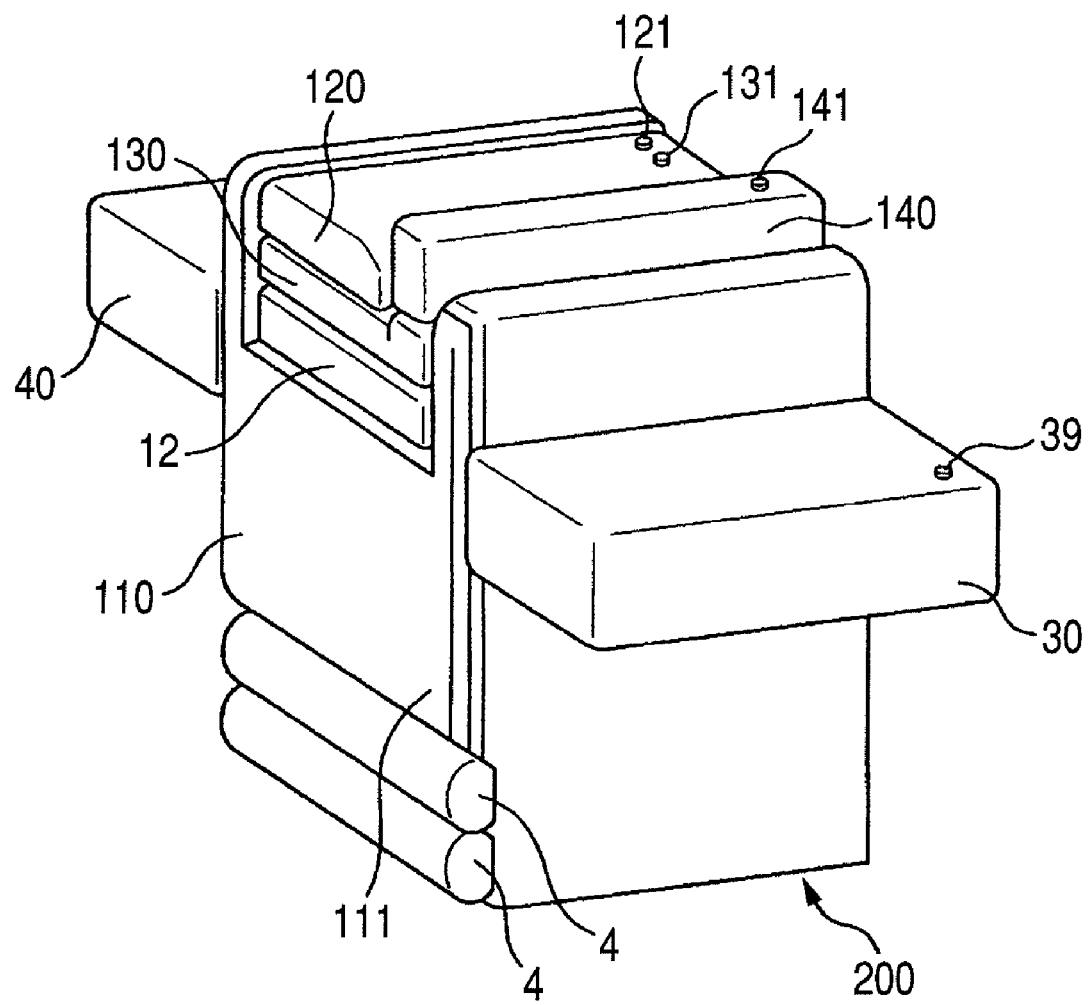
FIG. 2 is a first view illustrating structures of doors of the copying machine.
Figure 3:
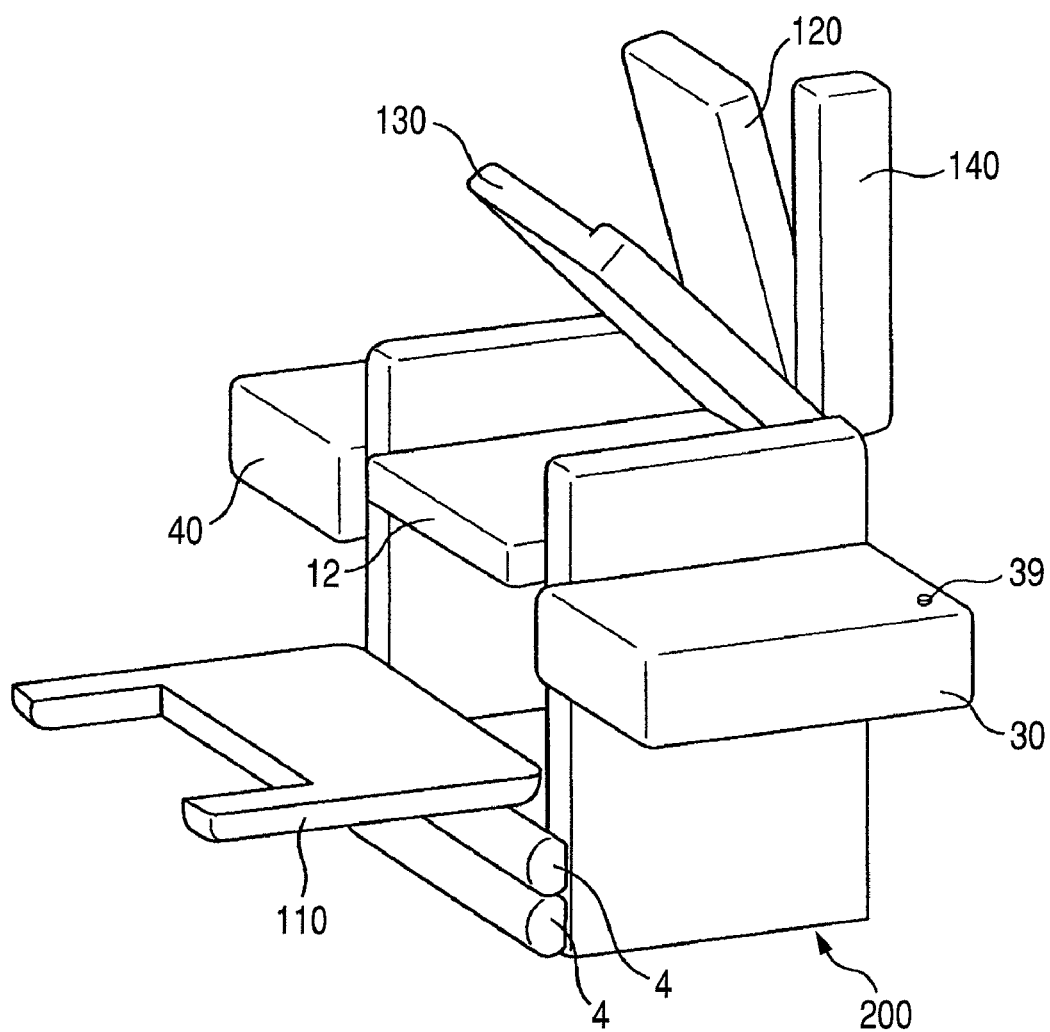
FIG. 3 is a second view illustrating the structures of the doors of the copying machine.
Figure 4:
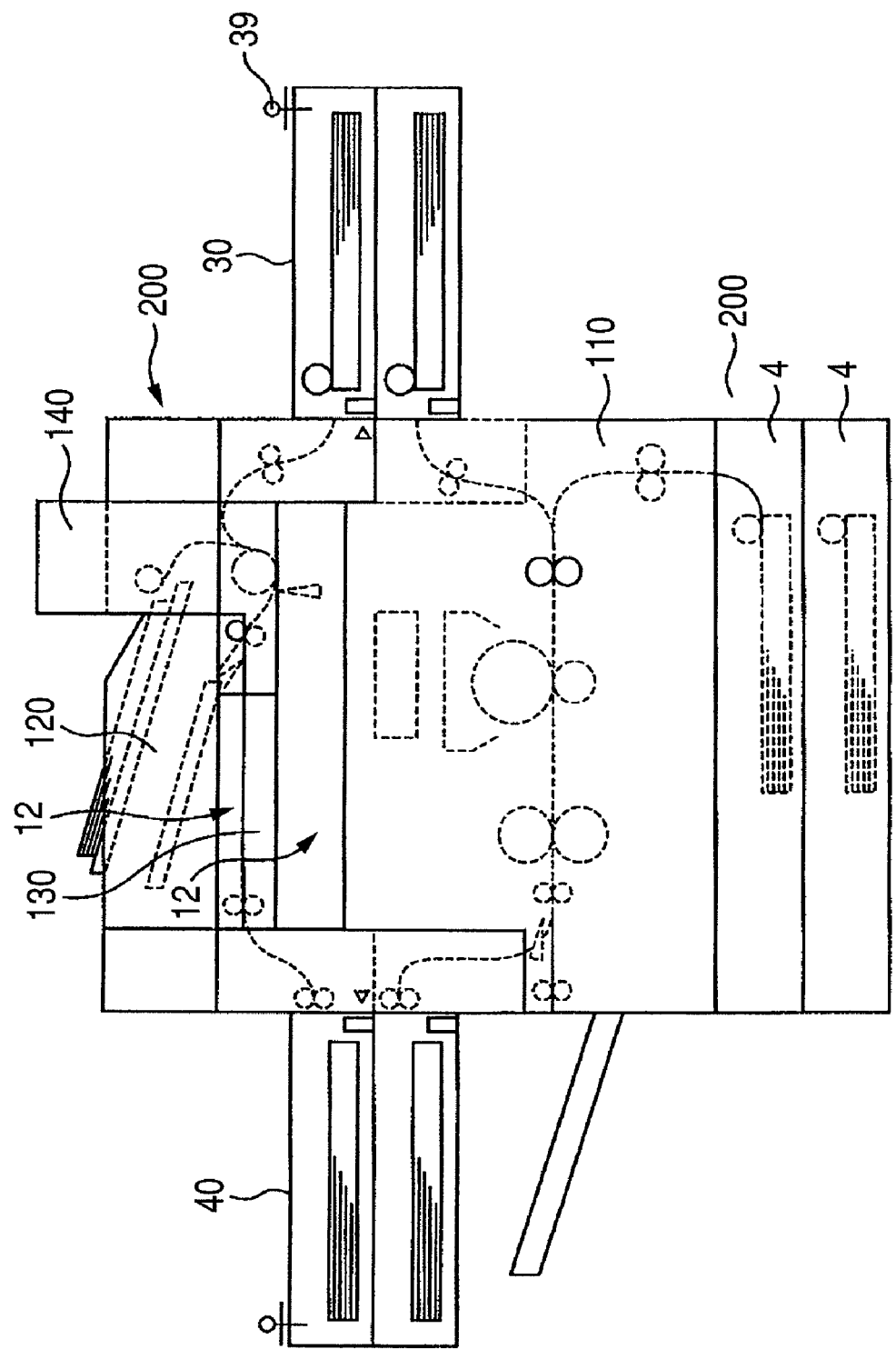
FIG. 4 is a third view illustrating the structures of the doors of the copying machine.

Incidentally, the copying machine 200 having the above-mentioned structure includes plural doors, which are opened, when the sheets are jammed, for taking out the jammed sheets. FIGS. 2 to 4 illustrate structures of the doors of the copying machine 200 according to this embodiment.

FIGS. 2 to 4 illustrate an image forming portion door 110 through which the user accesses, when jamming of a sheet occurs, the conveying path for performing image formation, and a part of the before-copy path portion 60 and the after-copy path portion 70. A confidential original conveyance door 120 is a door through which the user accesses the after-copy path portion 70 when a sheet is jammed in a part of the after-copy path portion 70. An original conveyance first door 130 and an original conveyance second door 140 are doors for allowing access particularly to the image reading device 12.

Note that, as described above, the copying machine 200 performs copy of confidential information. Further, the doors 110, 120, 130, and 140 are doors for allowing the user to access the conveying path through which the highly confidential originals and sheets are conveyed, and hence the doors need to be prevented from being opened at least when confidential information is copied.

Therefore, the image forming portion door 110 is provided with an image forming portion door lock 111 for locking the image forming portion door 110, and the confidential original conveyance door 120 is provided with a confidential original conveyance door lock 121 for locking the confidential original conveyance door 120. Further, the original conveyance first door 130 is provided with an original conveyance first door lock 131 for locking the original conveyance first door 130, and the original conveyance second door 140 is provided with an original conveyance second door lock 141 for locking the original conveyance second door 140. In this manner, the locks 111, 121, 131, and 141 are respectively provided to the doors 110, 120, 130, and 140 for allowing the user to access the conveyance paths through which the highly confidential originals and sheets are conveyed.

Figure 5:
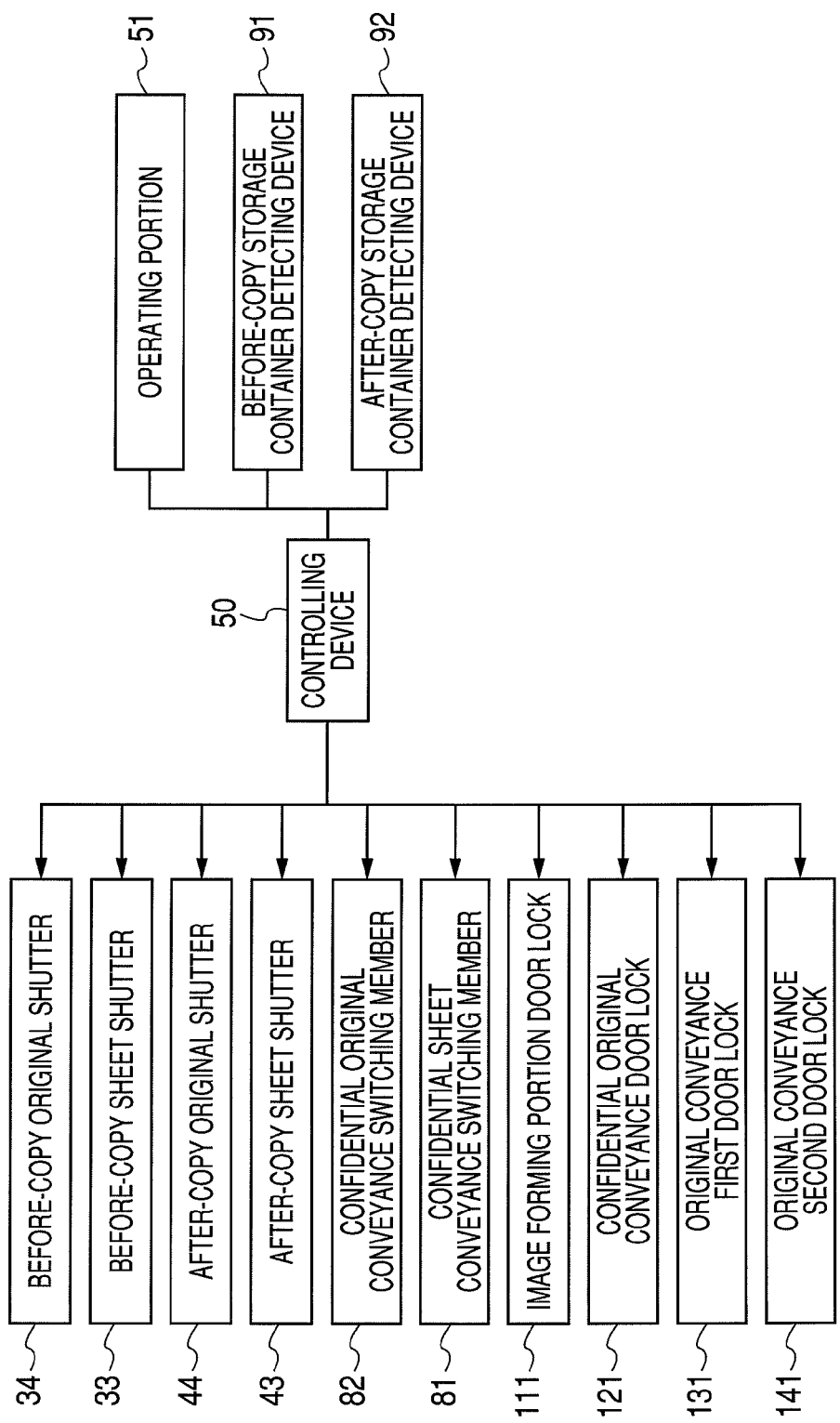
FIG. 5 is a control block diagram of the copying machine.

Note that, in this embodiment, as illustrated in FIG. 5, opening/closing operations (locking operations) of the image forming portion door lock 111, the confidential original conveyance door lock 121, the original conveyance first door lock 131, and the original conveyance second door lock 141 are controlled by the controlling device 50 so as to be electrically locked.

Note that, as illustrated in FIG. 5, detection signals from the before-copy storage container detecting device 91 and the after-copy storage container detecting device 92, a confidential job start signal, a lock canceling signal, and a password signal from an operating portion 51 are input to the controlling device 50.

Further, the controlling device 50 controls, based on information from the before-copy storage container detecting device 91 and the like, locking operations and unlocking operations of the image forming portion door lock 111, the confidential original conveyance door lock 121, the original conveyance first door lock 131, and the original conveyance second door lock 141. Further, the controlling device 50 controls, based on the information from the before-copy storage container detecting device 91 and the like, operations of the before-copy original shutter 34, the before-copy sheet shutter 33, the after-copy original shutter 44, the after-copy sheet shutter 43, the confidential original conveyance switching member 82, and the confidential sheet conveyance switching member 81.

Figure 6:
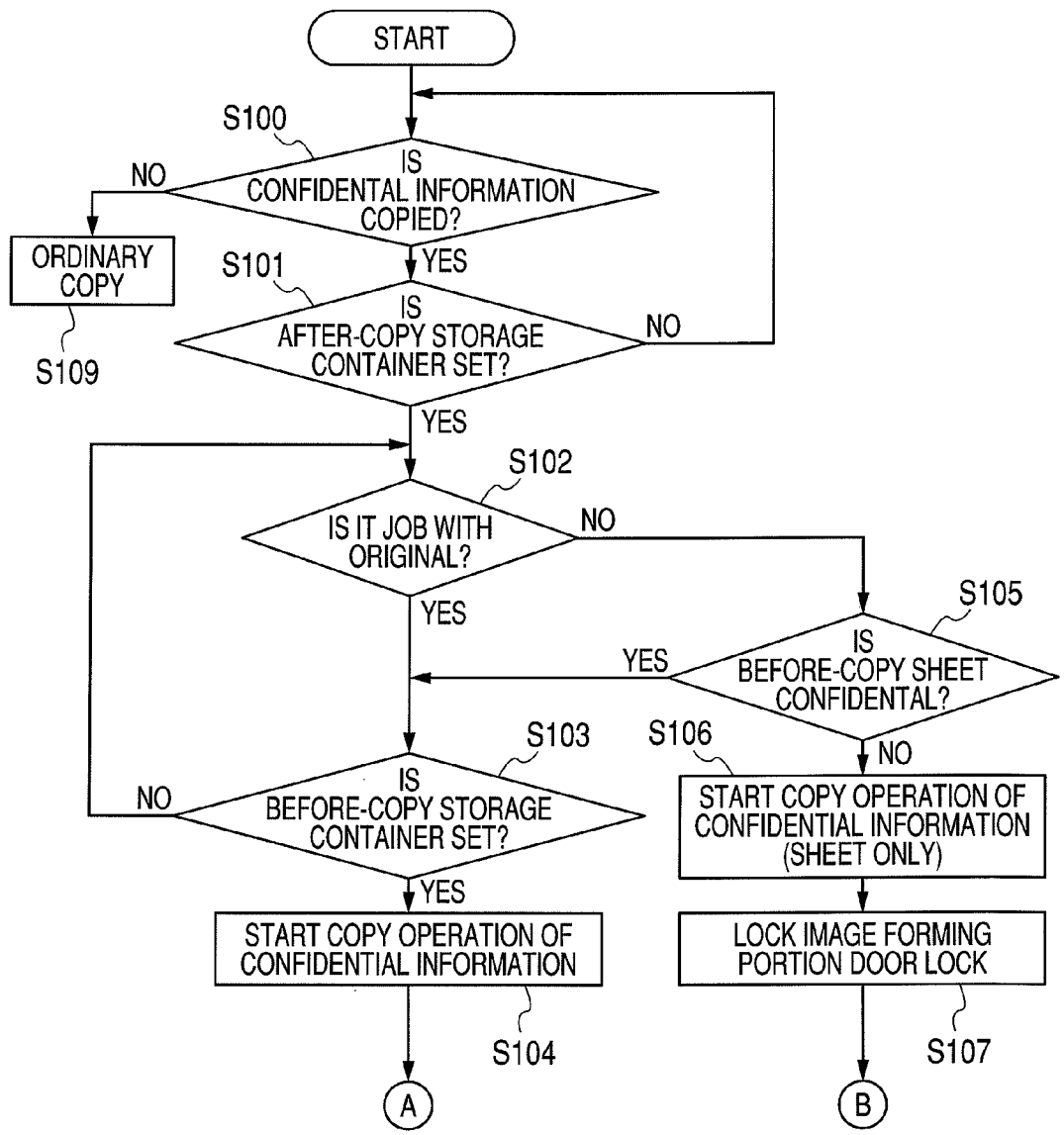
FIG. 6 is a first flow chart illustrating control operations of the copying machine in the case of copying confidential information.
Figure 7:
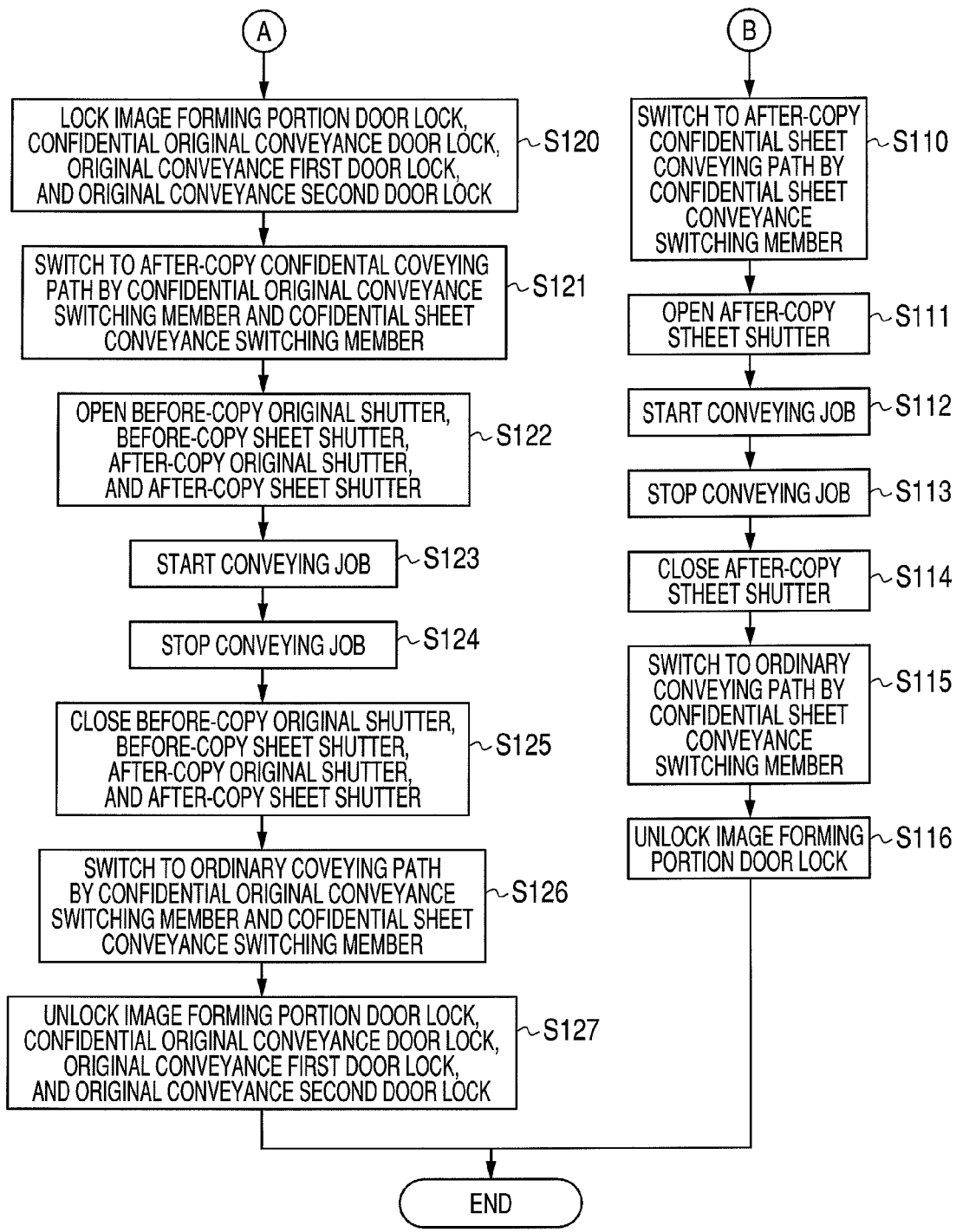
FIG. 7 is a second flow chart illustrating control operations of the copying machine in the case of copying confidential information.

Next, with reference to flow charts illustrated in FIGS. 6 and 7, there are described controlling operations of the controlling device 50 in the case of copying confidential information.

When the copy operation is started, the controlling device 50 determines based on the signals from the operating portion 51 whether or not the operation to be performed is copying of confidential information (S100). Then, when the controlling device 50 determines that the operation to be performed is not the copying of confidential information (NO at S100), an ordinary copy is performed (S109).

Further, when the controlling device 50 determines that the operation to be performed is the copying of confidential information (YES at S100), the controlling device 50 determines whether or not the after-copy storage container 40 is set (S101). In this case, even when the confidential job start signal is output, the copy operation is not performed until the after-copy storage container 40 is set because the after-copy storage container 40 for containing the sheets on which the confidential information is copied has not been set.

Figure 8:
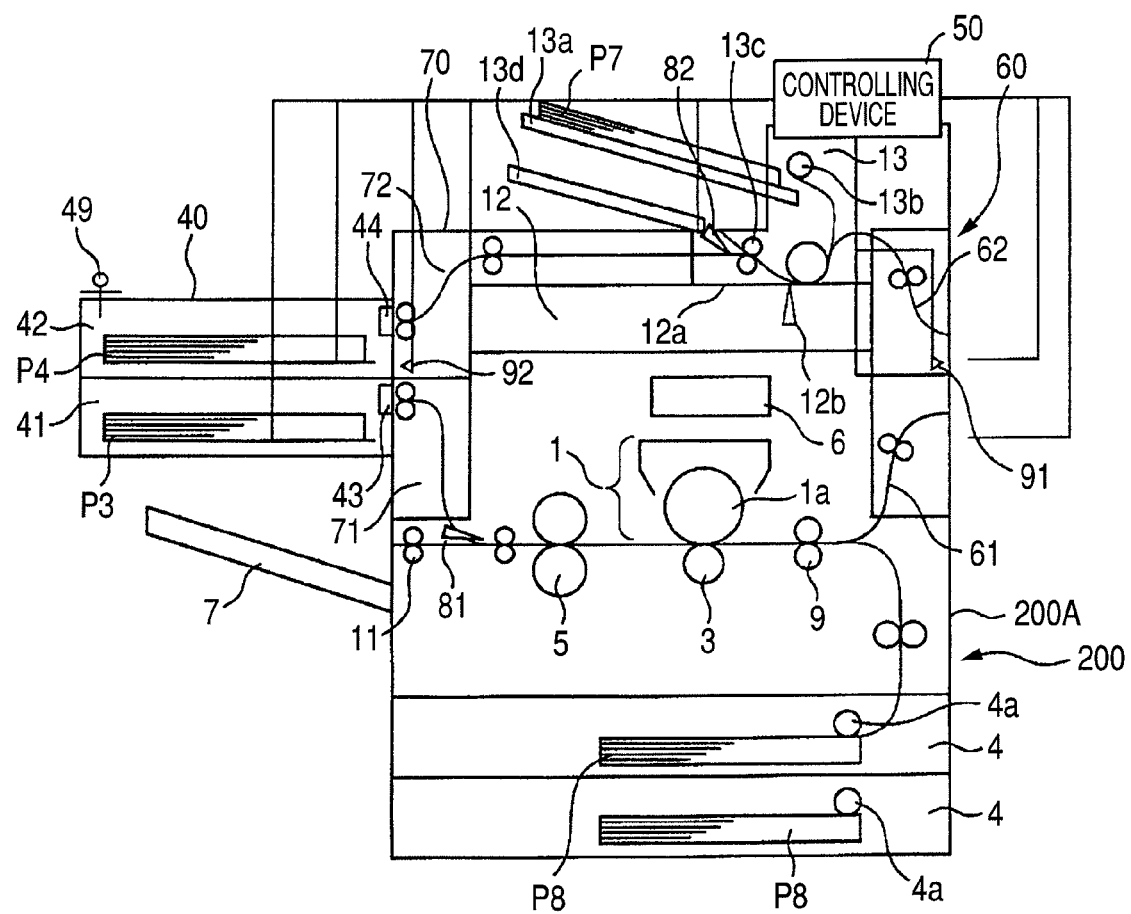
FIG. 8 is a first view illustrating control operations of the copying machine in the case of copying confidential information.

Note that, as illustrated in FIG. 8, when the after-copy storage container detecting device 92 detects that the after-copy storage container 40 is set, the detection signal is input from the after-copy storage container detecting device 92 to the controlling device 50, whereby the controlling device 50 recognizes that the after-copy storage container 40 is set.

Then, when the controlling device 50 determines that the after-copy storage container 40 is set in this manner (YES at S101), the controlling device 50 subsequently determines whether or not the copying of confidential information is a job for copying confidential information described on the originals, that is, whether or not the copying is a job with originals (S102).

Figure 10:
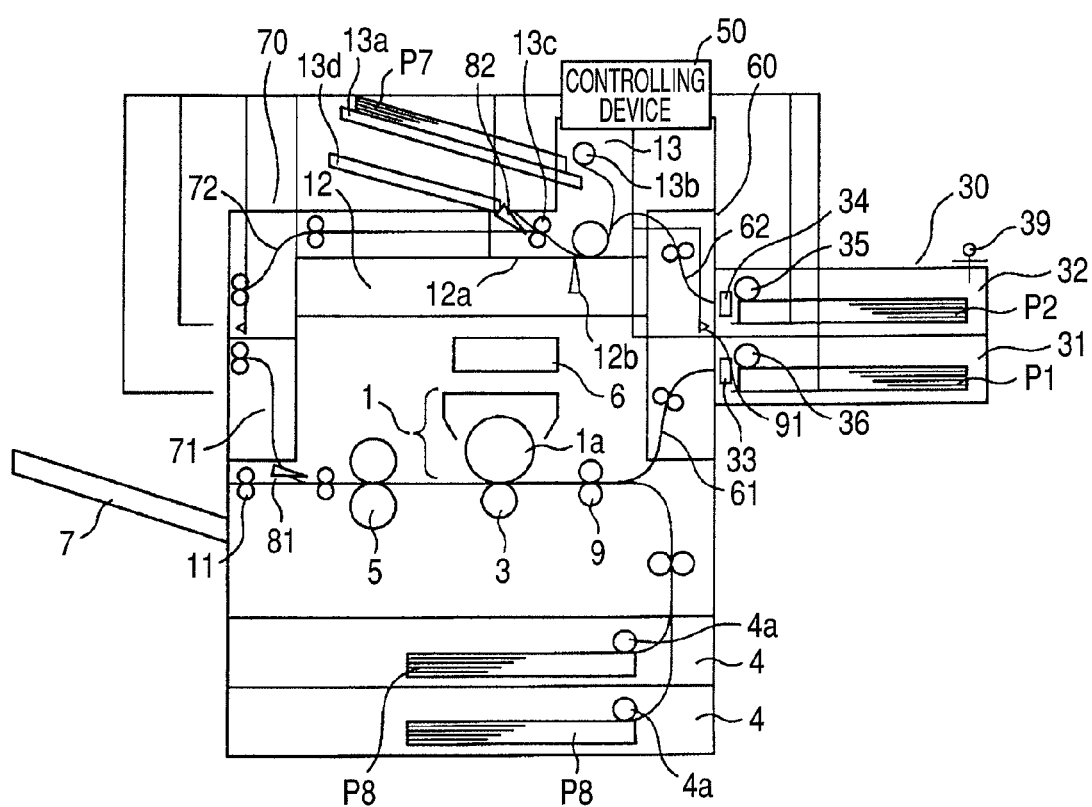
FIG. 10 is a third view illustrating control operations of the copying machine in the case of copying confidential information.

Then, when the controlling device 50 determines that the copying is a job with originals (YES at S102), the controlling device 50 subsequently determines whether or not the before-copy storage container 30 is set (S103). Note that, as illustrated in FIG. 10, when the before-copy storage container detecting device 91 detects that the before-copy storage container 40 is set, the detection signal is input from the before-copy storage container detecting device 91 to the controlling device 50, whereby the controlling device 50 recognizes that the before-copy storage container 30 is set.

Then, when the controlling device 50 determines that the before-copy storage container 30 is set as described above (YES at S103), a copy operation of confidential information for performing reading of the confidential originals and image formation on the confidential sheets is started (S104).

On the other hand, in the case of printing operations such as printing of information from the personal computer or a facsimile machine, that is, in the case of a job without originals (NO at S102), the controlling device 50 subsequently determines whether or not the before-copy sheets are confidential (S105). In this case, when the before-copy sheets are confidential (YES at S105), after the before-copy storage container 30 is set (YES at S103), copy operation of confidential information is started (S104).

Further, when the before-copy sheets are not confidential, that is, when the sheets are ordinary sheets (NO at S105), only sheets contained in the cassette 4 are conveyed, and the copy operation of confidential information is started with respect to the sheets (S106). Note that, in this time, the image forming portion door lock 111 is locked (S107), thereby preventing the image forming portion door 110 from being opened even when a sheet is jammed.

Figure 9:
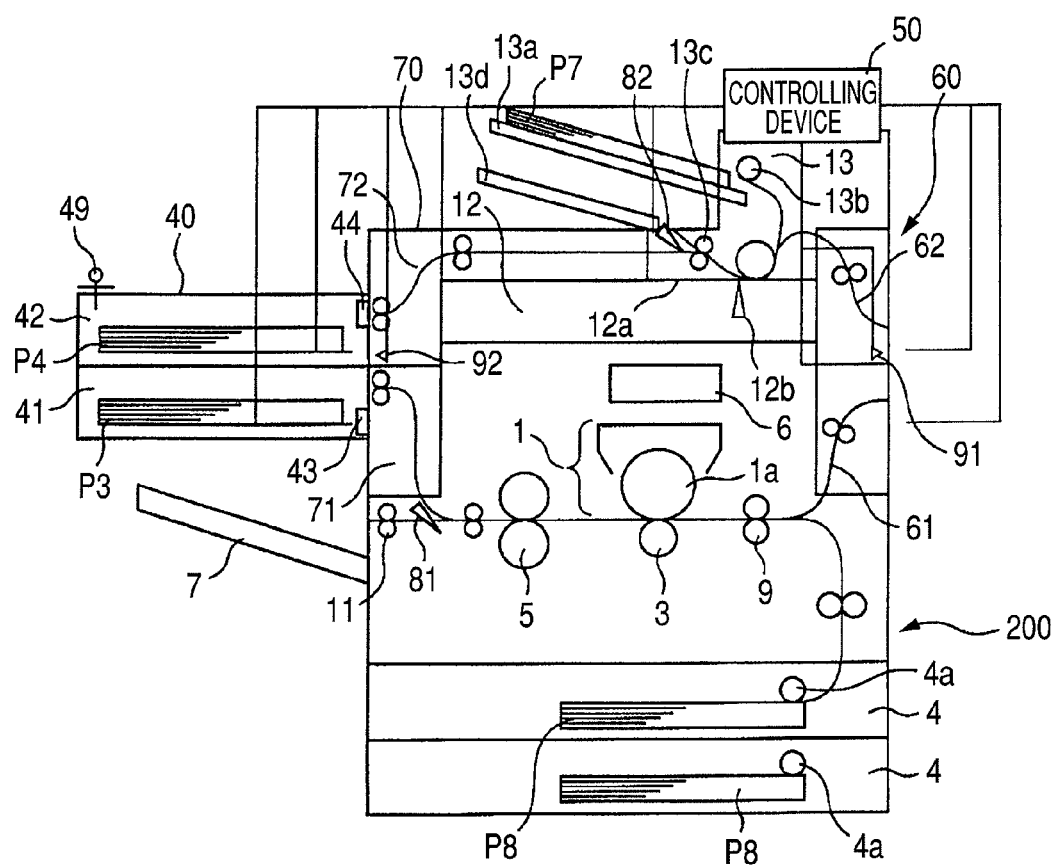
FIG. 9 is a second view illustrating control operations of the copying machine in the case of copying confidential information.

Then, when the copy operation of confidential information is started as described above, as illustrated in FIG. 9, the confidential sheet conveyance switching member 81 is switched so that the sheets are conveyed via the after-copy sheet conveying path 71 to the after-copy sheet cassette 41 (S110). Further, the after-copy sheet shutter 43 is opened (S111), and thereafter the conveying job is started (S112). As a result, the sheets P8 picked up from the cassette 4 are subjected to image formation, and thereafter delivered as the confidential sheets via the confidential sheet conveyance switching member 81 and the after-copy sheet conveying path 71 to the after-copy sheet cassette 41.

Then, after the conveying job is stopped (S113), the after-copy sheet shutter 43 is closed (S114). Further, the confidential sheet conveyance switching member 81 is switched to an ordinary conveying path (S115), and the image forming portion door 110 is unlocked (S116), whereby the copy operation of the confidential information is ended.

Note that, when the sheets are jammed during the copying and the user wants to clear the jamming sheet, the user inputs a password from the operating portion 51, and thereafter instructs to cancel the locks through the operating portion 51, whereby it is possible unlock the doors.

On the other hand, as described above, in the case where the controlling device 50 determines that the job to be performed is a job with originals (YES at S102), or in the case where the before-copy sheets are confidential (YES at S105), the copy operation is not started until the before-copy storage container 30 is set (S103). Then, when the before-copy storage container detecting device 91 detects that the before-copy storage container 30 is set as illustrated in FIG. 10 (YES at S103), a detection signal is input from the before-copy storage container detecting device 91 to the controlling device 50, whereby the controlling device 50 recognizes that the before-copy storage container 30 is set. Note that, in this case, regardless of the case of the copy operation or printing operation such as printing of information from a personal computer or a facsimile machine, even when a confidential job start signal 100 is issued, the copy operation of confidential information is not performed until the after-copy storage container 40 is set.

Figure 11:
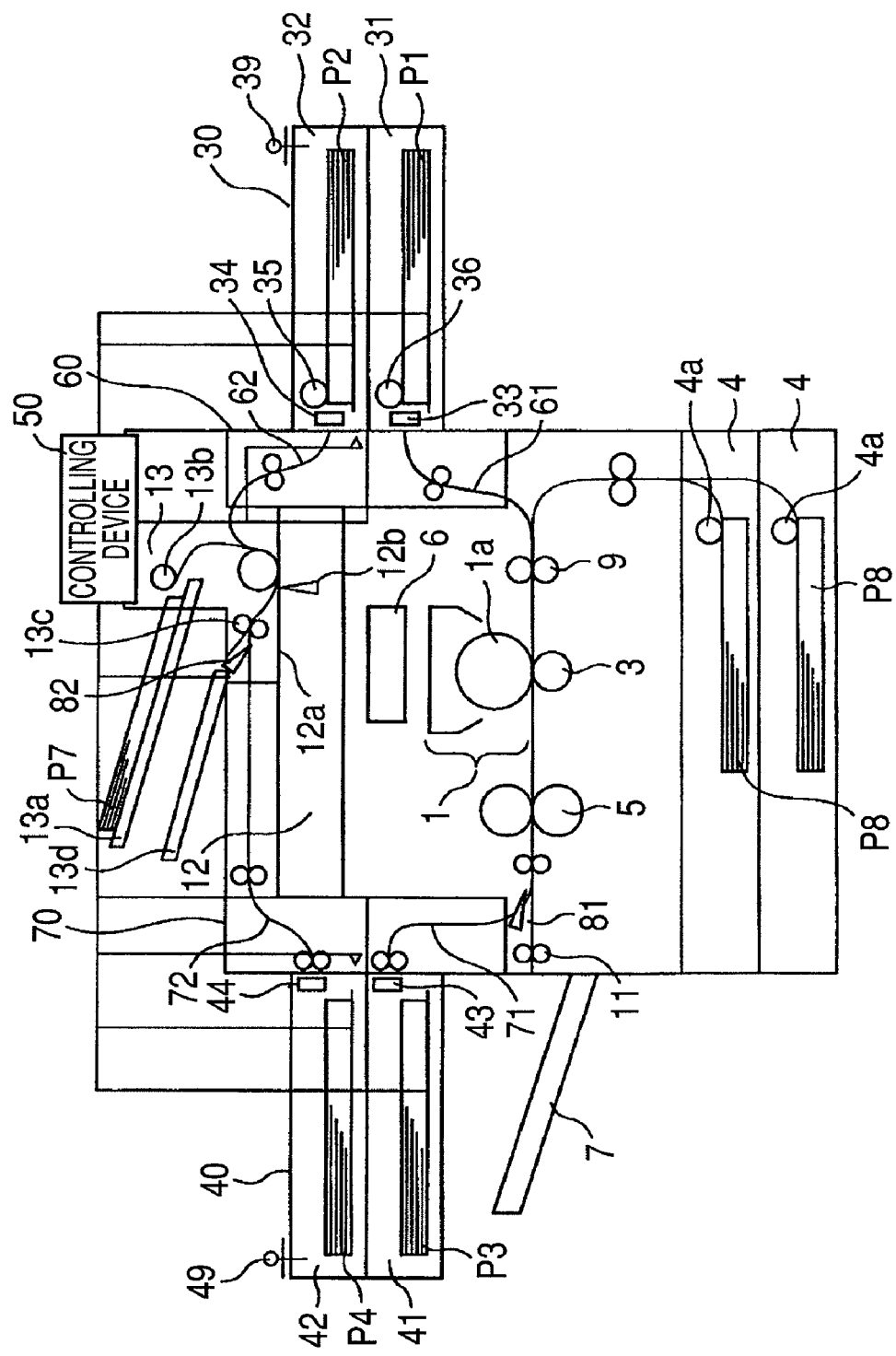
FIG. 11 is a fourth view illustrating control operations of the copying machine in the case of copying confidential information.

Subsequently, the before-copy storage container 30 is set and thereafter the after-copy storage container 40 is set as illustrated in FIG. 11 (YES at S101). After that, the confidential job start signal is outputted from the operating portion 51 together with the password, whereby the copy operation of confidential information is started. Note that, in this case, the image forming portion door lock 111, the confidential original conveyance door lock 121, the original conveyance first door lock 131, and the original conveyance second door lock 141 are locked (S120) so that the doors are prevented from being opened even when a sheet is jammed.

Subsequently, as illustrated in FIG. 1, the confidential original conveyance switching member 82 is switched so that the confidential originals P2 are conveyed from the before-copy storage container 30 via the before-copy original conveying path 62 and the after-copy original conveying path 72 to the after-copy storage container 40. Further, the confidential sheet conveyance switching member 81 is switched so that the confidential sheets are conveyed from the before-copy storage container 30 via the before-copy sheet conveying path 61 and the after-copy sheet conveying path 71 to the after-copy storage container 40 (S121). Further, the before-copy original shutter 34, the before-copy sheet shutter 33, the after-copy original shutter 44, and the after-copy sheet shutter 43 are opened (S122).

Then, the conveying job is started (S123). As a result, confidential image information on the before-copy originals P2 in the before-copy original cassette 32 is read by the image reading device 12, and the before-copy originals P2 are delivered to the after-copy original cassette 42 of the after-copy storage container 40. Further, the before-copy sheets P1 in the before-copy sheet cassette 31 is subjected to confidential image formation in the image forming portion 1, and thereafter delivered to the after-copy sheet cassette 41 of the after-copy storage container 40.

Note that, the sheets picked up from the cassette 4, on which confidential images are formed in the image forming portion 1, are delivered, after the image formation, as confidential sheets via the confidential sheet conveyance switching member 81 and the after-copy sheet conveying path 71 to the after-copy sheet cassette 41.

Then, when the conveying job is stopped (S124), the before-copy original shutter 34, the before-copy sheet shutter 33, the after-copy original shutter 44, and the after-copy sheet shutter 43 are closed (S125). Further, the confidential original conveyance switching member 82 and the confidential sheet conveyance switching member 81 are switched to the ordinary conveying path (S126), and the image forming portion door lock 111, the confidential original conveyance door lock 121, the original conveyance first door lock 131, and the original conveyance second door lock 141 are unlocked (S127). As a result, the copy operation of confidential information is ended.

In this case, if a sheet is jammed and hence the user wants to clear the jamming sheet, the user inputs a password so as to instruct through the operating portion to cancel the locks, whereby it is possible to unlock the doors.

As described above, in this embodiment, the before-copy originals P2 whose confidential information is to be read, and the before-copy sheets P1 whose security needs to be ensured are contained in the before-copy storage container 30. Further, the after-copy originals P4 whose confidential information is read, and the after-copy sheets P3 on which the confidential information is copied are contained in the after-copy storage container 40.

Further, after mounting at least the after-copy storage container 40 to the copying machine main body 200A according to types of images on originals to be read and sheets on which images are formed, reading of the images on originals and the image formation with respect to the sheets are started. In this manner, while security of information is ensured, usability can be improved.

While the present invention has been described with reference to an exemplary embodiment, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-149538 filed on Jun. 6, 2008, which is hereby incorporated by reference herein.

What is claimed is:

1. An image forming system, comprising: an image reading portion, which reads an image on an original; an image forming portion, which forms an image on a sheet; a first storage device, which stores an original before the image reading portion reads an image thereon and a sheet before the image forming portion forms an image thereon, the first storage device being detachably mounted to the image forming system;
   a second storage device, which stores an original after the image reading portion reads an image thereon and a sheet after the image forming portion forms an image thereon, the second storage device being detachably mounted to the image forming system; and
   a before-read original conveying path through which a before-image-read original stored in the first storage device is conveyed to the image reading portion; a before-image-formation sheet conveying path through which a before-image-formation sheet stored in the first storage device is conveyed to the image forming portion; an after-read original conveying path through which an after-image-read original is conveyed to the second storage device; and an after-image-formation sheet conveying path through which an after-image-formation sheet is conveyed to the second storage device.

2. An image forming system according to claim 1, wherein, after the second storage device is mounted to the image forming system, reading of the image on the original stored in the first storage device and image formation on the sheet stored in the first storage device are started.

3. An image forming system according to claim 1, further comprising: a before-read original shutter, which is provided to the first storage device, seals the first storage device, and is opened when the before-image-read original is conveyed to the before-read original conveying path; a before-image-formation sheet shutter, which is provided to the first storage device, seals the first storage device, and is opened when the before-image-formation sheet is conveyed to the before-image-formation sheet conveying path; an after-read original shutter, which is provided to the second storage device, seals the second storage device, and is opened when the after-image-read original conveyed from the after-read original conveying path is contained in the second storage device; an after-image-formation sheet shutter, which is provided to the second storage device, seals the second storage device, and is opened when the after-image-formation sheet is contained in the second storage device; a first mount detecting device, which detects that the first storage device is mounted; a second mount detecting device, which detects that the second storage device is mounted; and a controlling device, which actuates, based on signals from the first mount detecting device and the second mount detecting device, the before-read original shutter, the before-image-formation sheet shutter, the after-read original shutter, and the after-image-formation sheet shutter.

4. An image forming system according to claim 1, further comprising: a plurality of doors, which open the before-read original conveying path, the before-image-formation sheet conveying path, the after-read original conveying path, and the after-image-formation sheet conveying path, respectively; a plurality of locks, which electrically locks the plurality of doors, respectively; and a controlling device, which controls locking of the plurality of locks.

* * * * *